US009144232B2

(12) United States Patent
 Bodo

(10) Patent No.: US 9,144,232 B2
(45) Date of Patent: Sep. 29, 2015

(54) PYROTECHNIC DEVICE WITH SAFE FIRING

(75) Inventor: Lionel Bodo, Ayze (FR)

(73) Assignee: CREA, Bonneville (FR)

( * ) Notice: Subject to any disclaimer, the term of this patent is extended or adjusted under 35 U.S.C. 154(b) by 868 days.

(21) Appl. No.: 13/314,374

(22) Filed: Dec. 8, 2011

(65) Prior Publication Data

US 2012/0144728 A1    Jun. 14, 2012

(30) Foreign Application Priority Data

Dec. 9, 2010  (FR) ...................................... 10 60330

(51) Int. Cl.
 *A01M 27/00*    (2006.01)
 *A01M 23/38*    (2006.01)

(52) U.S. Cl.
 CPC .............. *A01M 27/00* (2013.01); *A01M 23/38* (2013.01)

(58) Field of Classification Search
 CPC .............................. A01M 27/00; A01M 23/38
 USPC ........ 43/84, 98, 112; 102/424, 427–429, 206, 102/216, 218, 262
 See application file for complete search history.

(56) References Cited

U.S. PATENT DOCUMENTS

| 1,848,614 | A | * | 3/1932 | Folmer et al. | 43/112 |
|---|---|---|---|---|---|
| 1,899,199 | A | * | 2/1933 | Kaiser | 43/98 |
| 1,936,468 | A | * | 11/1933 | Folmer et al. | 43/112 |
| 2,456,657 | A | * | 12/1948 | Vagts | 102/427 |
| 3,304,864 | A | * | 2/1967 | Thomanek | 102/427 |
| 3,346,988 | A | * | 10/1967 | Pickering | 43/112 |
| 3,491,478 | A | * | 1/1970 | Gilbert | 43/112 |
| 3,559,582 | A | * | 2/1971 | Hrzek | 102/427 |
| 3,817,180 | A | * | 6/1974 | Finger | 102/427 |
| 3,894,351 | A | * | 7/1975 | Iannini | 43/112 |
| 3,998,000 | A | * | 12/1976 | Gilbert | 43/112 |
| 4,074,456 | A | * | 2/1978 | Tidwell | 43/98 |
| 4,109,406 | A | * | 8/1978 | Denninger | 43/84 |
| 4,182,069 | A | * | 1/1980 | De Yoreo | 43/112 |
| 4,213,265 | A | * | 7/1980 | Denninger et al. | 43/84 |
| 4,709,502 | A | * | 12/1987 | Bierman | 43/112 |
| 4,780,985 | A | * | 11/1988 | Coots | 43/98 |
| 6,009,662 | A | * | 1/2000 | Chang | 43/112 |
| 6,629,498 | B1 | * | 10/2003 | Marquis | 102/206 |

(Continued)

FOREIGN PATENT DOCUMENTS

| EP | 1109446 B1 | 6/2001 | | |
|---|---|---|---|---|
| FR | 2719192 A1 | * | 11/1995 | ............ A01M 27/00 |
| FR | 2750294 A1 | * | 1/1998 | ............ A01M 23/38 |

(Continued)

*Primary Examiner* — Darren W Ark
(74) *Attorney, Agent, or Firm* — William H. Eilberg

(57) ABSTRACT

Pyrotechnic device (1) intended for the destruction of animals digging tunnels, such as moles by the firing of a pyrotechnic charge (2), comprising means (3) for detecting the animal and an electrical firing circuit (4) comprising a firing contactor (5) driven by the detection means (3). The pyrotechnic device (1) comprises:
 a first housing (6) intended to be installed on the ground (28), electrically connected to the pyrotechnic charge (2), and comprising the detection means (3),
 a second housing (7) intended to be installed on the ground at a distance from the first housing (6) to which it is linked via wired connection means (8), and comprising first means (9) for breaking the electrical firing circuit (4) making it possible to selectively break or establish the continuity of a first section (10) of the electrical firing circuit (4).

18 Claims, 11 Drawing Sheets

(56) References Cited

U.S. PATENT DOCUMENTS

| | | | |
|---|---|---|---|
| 8,646,387 B2 * | 2/2014 | Schlenter | 102/217 |
| 2013/0036931 A1 * | 2/2013 | Schlenter | 102/206 |

FOREIGN PATENT DOCUMENTS

| | | | | |
|---|---|---|---|---|
| FR | 2832029 A1 * | 5/2003 | | A01M 27/00 |
| FR | 2897510 A1 * | 8/2007 | | A01M 27/00 |
| FR | 2900542 A1 * | 11/2007 | | A01M 27/00 |
| GB | 2343356 A * | 5/2000 | | A01M 27/00 |
| GB | 2354693 A | 4/2001 | | |
| WO | 00/11945 A1 | 3/2000 | | |
| WO | WO 0011945 A1 * | 3/2000 | | A01M 27/00 |
| WO | WO 03041498 A1 * | 5/2003 | | A01M 27/00 |

* cited by examiner

PYROTECHNIC DEVICE WITH SAFE FIRING

TECHNICAL FIELD OF THE INVENTION

The present invention relates to a device intended for the destruction of animals digging tunnels such as moles, and relates more particularly to a pyrotechnic device intended to destroy animals by the firing of a pyrotechnic charge.

Such a device is, for example, known from the document FR 2 832 029. Such a device generally comprises means for detecting the animal and a housing containing:
- an electrical firing circuit comprising a firing contactor driven by the detection means,
- means for breaking the electrical firing circuit making it possible to selectively break or re-establish the continuity of a section of the electrical firing circuit.

The detection means are generally installed in the open chimney of a tunnel while the pyrotechnic charge is installed in the tunnel. When the mole plugs the chimney that has remained open, the mole pushes back the earth and then displaces the detection means, which provokes the closure of the firing contactor and the firing of the pyrotechnic charge. The shockwave caused by the deflagration then kills the animal.

This type of trap is effective and makes it possible, by the burying of the pyrotechnic charge, to avoid injuring a user or causing surface damage.

However, there is a risk of accidentally triggering the device when putting it in place and connecting the pyrotechnic charge. To limit this risk, safety systems have been proposed.

To this end, the document EP 1 109 446 describes a safety device, consisting of a movable part, one of the positions of which mechanically opposes the establishing of the firing contact, and which is able to prevent any unwanted triggering of the pyrotechnic charge during the pyrotechnic charge connection operations or when installing or removing the pyrotechnic device.

The document FR 2 897 510 describes an electronic safety system arranged to allow the firing of the pyrotechnic charge only after a determined time counted from the activation of the trap, which activation corresponds to a specific manipulation of the device by the operator when putting the pyrotechnic device in place.

The safety devices of the abovementioned documents do not however give satisfaction. It is in fact possible, for a user of the device of document EP 1 109 446 to omit or forget the movable part intended to mechanically oppose the establishing of the firing contact. Also, it is difficult, for a user of the device of document FR 2 897 510, to estimate the time that he or she is allowed to reach shelter after activation.

Furthermore, none of these devices effectively protects a user against any unwanted triggering of the pyrotechnic charge once the pyrotechnic device is installed. It is in fact always possible for a child who is not being watched to manipulate the pyrotechnic device after installation and actuate the detection means which then provoke the accidental firing of the pyrotechnic charge.

Another drawback of the existing devices is that it is difficult to visually and immediately take stock of the state of the pyrotechnic device: it is not known whether the latter is activated, so that its pyrotechnic charge is ready to explode, or whether it is deactivated, any explosion of the pyrotechnic charge being prevented and the device then being ineffective.

SUMMARY OF THE INVENTION

A first problem proposed by the invention is to limit the risk of unwanted triggering of the pyrotechnic charge of the pyrotechnic device, and to do so both when putting the pyrotechnic device in place and after it has been put in place, as well as when removing it.

According to another aspect, the invention aims to allow for a fast visual diagnostic of the pyrotechnic device in order to unambiguously determine its state of activation or of deactivation.

To achieve these and other aims, the invention proposes a pyrotechnic device intended for the destruction of animals digging tunnels such as moles by the firing of a pyrotechnic charge, comprising means for detecting the animal and an electrical firing circuit comprising a firing contactor driven by the detection means; according to the invention, the pyrotechnic device comprises:
- a first housing intended to be installed on the ground, electrically connected to the pyrotechnic charge and comprising the detection means,
- a second housing intended to be installed on the ground at a distance from the first housing, linked to the first housing via wired connection means, and comprising first means for breaking the electrical firing circuit that can assume a breaking state and a continuity state which respectively break or establish the continuity of a first section of the electrical firing circuit.

The first step in putting such a device in place is to install the pyrotechnic charge, the first housing and the detection means. During this step, the first breaking means are in the breaking state and break the continuity of the first section of the electrical firing circuit, so that there is no risk of an accidental firing of the pyrotechnic charge. The user then installs the second housing by arranging the latter at a distance from the first housing and from the pyrotechnic charge by virtue of the wired connection means. After the second housing has been installed, the user operates the first breaking means to establish the continuity of the first section of the electrical firing circuit. During this step of moving the first breaking means to establish the continuity of the first section of the electrical firing circuit, the user is therefore safe since he or she is situated at a distance from the first housing and from the pyrotechnic charge. The pyrotechnic device is then activated and ready to operate.

When removing the pyrotechnic device, the user must begin by operating the first breaking means, to break the continuity of the first section of the electrical firing circuit. At this moment, the user acts on the second housing and is therefore safe, at a distance from the first housing and from the pyrotechnic charge. After this operation, the pyrotechnic device is deactivated and can no longer operate. Then, the user removes the first housing, the detection means, and the pyrotechnic charge whose firing can no longer occur.

The user is thus effectively protected both when installing the pyrotechnic device and when removing it.

Advantageously, the connection means between the first and second housings may be rigid. A minimum safety distance is thus retained between the first and second housings. The use of rigid connection means prevents the user from positioning the second housing in proximity to the first housing, and thus guarantees that the user will remain at a distance from the first housing and from the pyrotechnic charge when activating and deactivating the pyrotechnic device.

Preferably, the connection means may extend between the first and the second housings by a length of at least one meter approximately. A distance of one meter is generally sufficient for the pyrotechnic charge not to risk injuring the user.

Advantageously, the second housing may comprise an electrical power source for the electrical firing circuit, preferably arranged to be removable in a recess of the second housing. The electrical power source can thus be installed right at the end of the installation of the pyrotechnic device, and can be removed right at the start of the uninstalling procedure, the user then standing at a distance from the first housing and from the pyrotechnic charge.

Preferably, the first housing may comprise second means for breaking the electrical firing circuit which can selectively assume a breaking state and a continuity state which respectively break or establish the continuity of a second section of the electrical firing circuit. There is thus at least a dual safety by the use of the first and second breaking means.

Advantageously, the pyrotechnic device may include:
means for disabling the electrical firing circuit, driven by control means,
means for detecting the state of the first breaking means and of the second breaking means,
when the first breaking means switch from the breaking state to the continuity state while the second breaking means are in the breaking state, the control means drive the disabling means to disable the electrical firing circuit until the first and second breaking means are once again in the breaking state.

The user is thus constrained and forced to observe a previously established order of installation in order to be able to activate the pyrotechnic device. The user thus absolutely must have installed the first housing, the pyrotechnic charge and the detection means before the second housing can be installed. The user is therefore safe when establishing the continuity of the first section of the electrical firing circuit, since he or she is necessarily situated at a distance from the first housing and from the pyrotechnic charge.

Preferably, provision can be made for:
the second breaking means to include a first removable cover, which can be fitted over the first housing and over the detection means in a covering position, and which can be separated from the first housing in a removed position,
in the removed position of the first cover, the continuity of the second section of the electrical firing circuit to be broken,
in the covering position of the first cover, the continuity of the second section of the electrical firing circuit to be established.

The pyrotechnic device is put in place without the first removable cover. The continuity of the second section of the electrical firing circuit is then broken and there is then no risk of accidental explosion of the pyrotechnic charge.

The state of the pyrotechnic device can easily be perceived visually: if the first cover is in the removed position, then the pyrotechnic device is deactivated.

When the pyrotechnic device is activated, the first removable cover is in the covering position and simultaneously covers the first housing and the detection means. The first removable cover thus limits access to the detection means and to the first housing, which makes the people safe once the pyrotechnic device is put in place.

For example, a child wanting to manipulate the pyrotechnic device once the latter has been put in place must remove the first removable cover before being able to access the detection means and/or the first housing. The child can thus freely manipulate the first housing and/or the detection means only once the first removable cover has been removed, which will have previously deactivated the pyrotechnic device.

Preferably, provision can be made for:
the first breaking means to include a second removable cover, which can be fitted over the second housing in a covering position, and which can be separated from the second housing in a removed position,
in the removed position of the second cover, the continuity of the first section of the electrical firing circuit to be broken,
in the covering position of the second cover, the continuity of the first section of the electrical firing circuit to be established.

The pyrotechnic device is put in place without the second removable cover. The continuity of the first section of the electrical firing circuit is then broken and there is therefore no risk of accidental explosion of the pyrotechnic charge.

The state of the pyrotechnic device can easily be perceived visually: if the second cover is in the removed position, then the pyrotechnic device is deactivated.

When the pyrotechnic device comprises both a first cover and a second cover, the state of the pyrotechnic device can easily be perceived visually: if one or other of the first and second covers is in the removed position, then the pyrotechnic device is deactivated.

In a first embodiment, provision can be made for:
the first or second means for breaking the electrical firing circuit to include a switch, connected in series in the electrical firing circuit, and permanently returned to the open position by elastic return means,
the first or second cover to include bearing means which, when said first, respectively second, cover is moved to the covering position, push back the switch to the closed position against the elastic return means.

In a second embodiment, provision can be made for:
the electrical firing circuit to include a movable circuit section attached to the first or second cover and a fixed circuit part attached to the first or second housing, said fixed circuit part including a break,
when the first or second cover is in the covering position, the movable circuit section to be in contact with the fixed circuit part to establish the continuity of the electrical firing circuit in the area of the break.

Advantageously, provision can be made for:
the first or second housing to include a bottom laying face suitable for resting on the ground,
the first housing and the first cover, or the second housing and the second cover, to be conformed and dimensioned so that, when the first or second housing rests on the ground and the first or second cover is in the covering position, the first or second cover prevents a user from being able to manually grasp the first housing and the detection means or the second housing.

There is thus little risk that, once placed on the ground, the pyrotechnic device can be accidentally triggered and injure a person.

Preferably, provision can be made for the first or second cover to include a top wall of dimensions such that said top wall juts out all around the first housing and the detection means or the second housing by a peripheral overhang.

The peripheral overhang makes it possible to effectively prevent a user from accessing the housings and/or, where appropriate, the detection means, which thus avoids an accidental firing of the pyrotechnic charge.

Advantageously, provision can be made for:
the first or second housing to include a bottom laying face suitable for resting on the ground,
the first or second cover to include a lateral peripheral wall extending away from the top wall to a bottom peripheral edge,
the lateral peripheral wall of the first or second cover to extend by a height such that, when the first or second housing rests on the ground and the first or second cover is fitted respectively on the first or second housing, the bottom peripheral edge to be situated in the vicinity of the level of the bottom laying face.

The user will thus have difficulty passing his or her hands under the removable cover to access the housings and/or, where appropriate, the detection means. It will thus be difficult for him or her to manage to trigger a firing without first having removed one of the removable covers and thus deactivated the pyrotechnic device.

Preferably, provision can be made for:
the connection means to include flexible electrical conduction means,
the connection means to penetrate into the first and/or second housing through an entry which is situated at a height relative to the bottom laying face which is greater than the height which separates the bottom peripheral edge of the first or second cover from the level of the bottom laying face.

Thus, if a person such as a child manages to grasp the conduction means of the pyrotechnic device, the pulling force exerted on the conduction means lifts one or more of the covers. The pyrotechnic device is then automatically deactivated.

Advantageously, the detection means may comprise a feeler intended to be wholly or partly inserted into the tunnel of the animal.

A feeler is a simple, reliable and effective means for detecting an animal such as a mole.

Preferably, said feeler may comprise a plurality of separable rod sections.

The length of the feeler can thus easily be modified and adapted according to the depth of the tunnel dug by the animals, and remains compatible with the presence of the first removable cover when the latter is in the covering position.

As an alternative, it is possible to provide for the feeler to comprise a telescopic rod.

Advantageously, provision can be made for:
the first or second housing to include a bottom laying face suitable for resting on the ground,
the first or second housing to include means for anchoring in the ground extending from the bottom laying face.

The anchoring means make it possible to avoid any movement of the housings once the pyrotechnic device is installed on the ground. The risk of unwanted movements of the housings and/or of the detection means which may result in an accidental firing of the pyrotechnic charge, is thus limited.

BRIEF DESCRIPTION OF THE DRAWINGS

Other objects, features and advantages of the present invention will become apparent from the following description of particular embodiments, given with reference to the appended Figures, in which.

DESCRIPTION OF THE PREFERRED EMBODIMENTS

FIGS. 1 to 12 illustrate two embodiments of a pyrotechnic device according to the invention.

Figure 1:
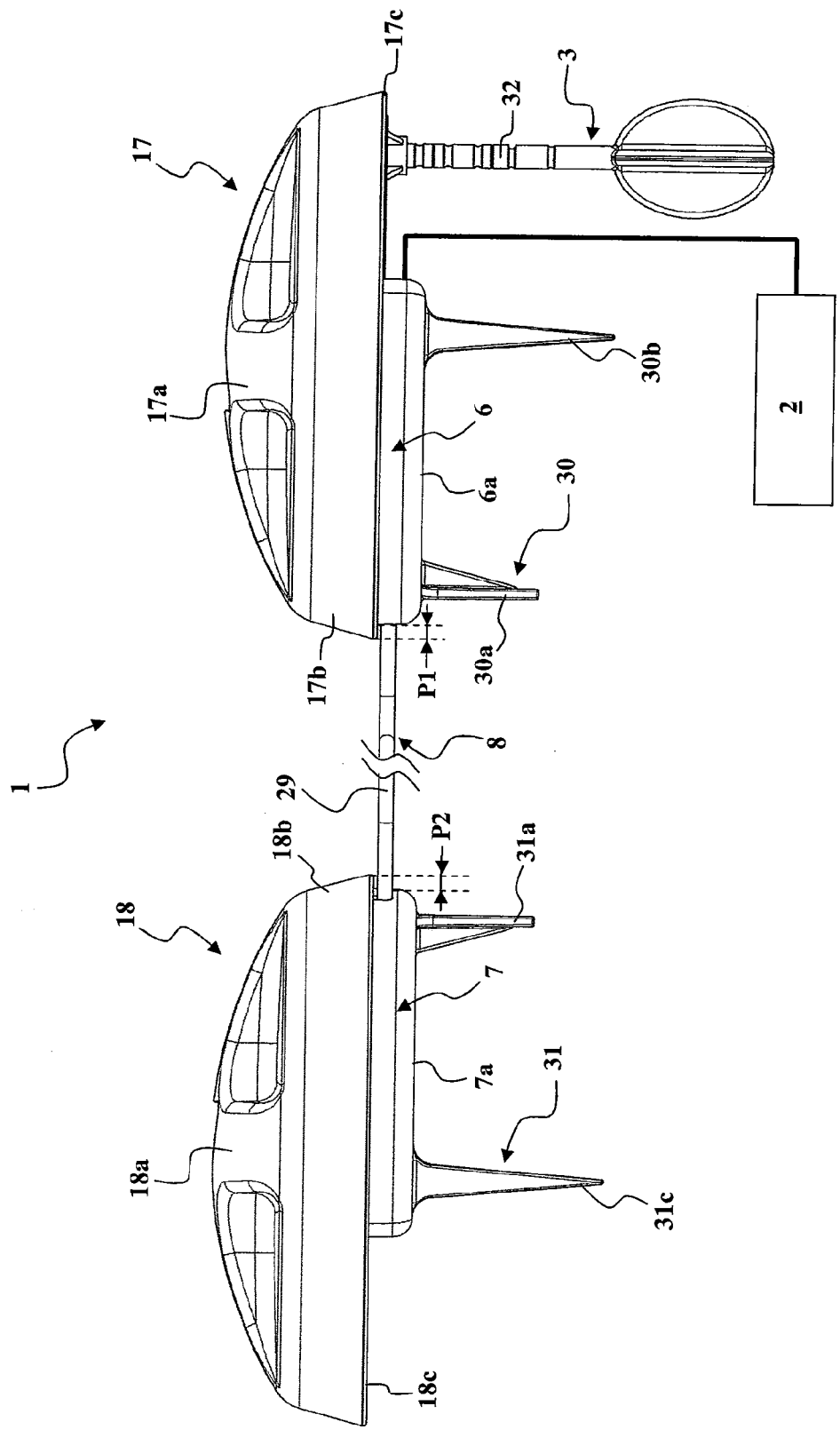
FIG. 1 is a side view of a pyrotechnic device according to a first embodiment of the invention, with first and second removable covers in the covering position.

In FIG. 1, a pyrotechnic device 1 is shown which is intended for the destruction of animals digging tunnels such as moles by the firing of a pyrotechnic charge 2. The pyrotechnic device 1 comprises means 3 for detecting the animal and an electrical firing circuit 4 comprising a firing contactor 5 driven by the detection means 3 (FIGS. 9 and 10).

Figure 9:
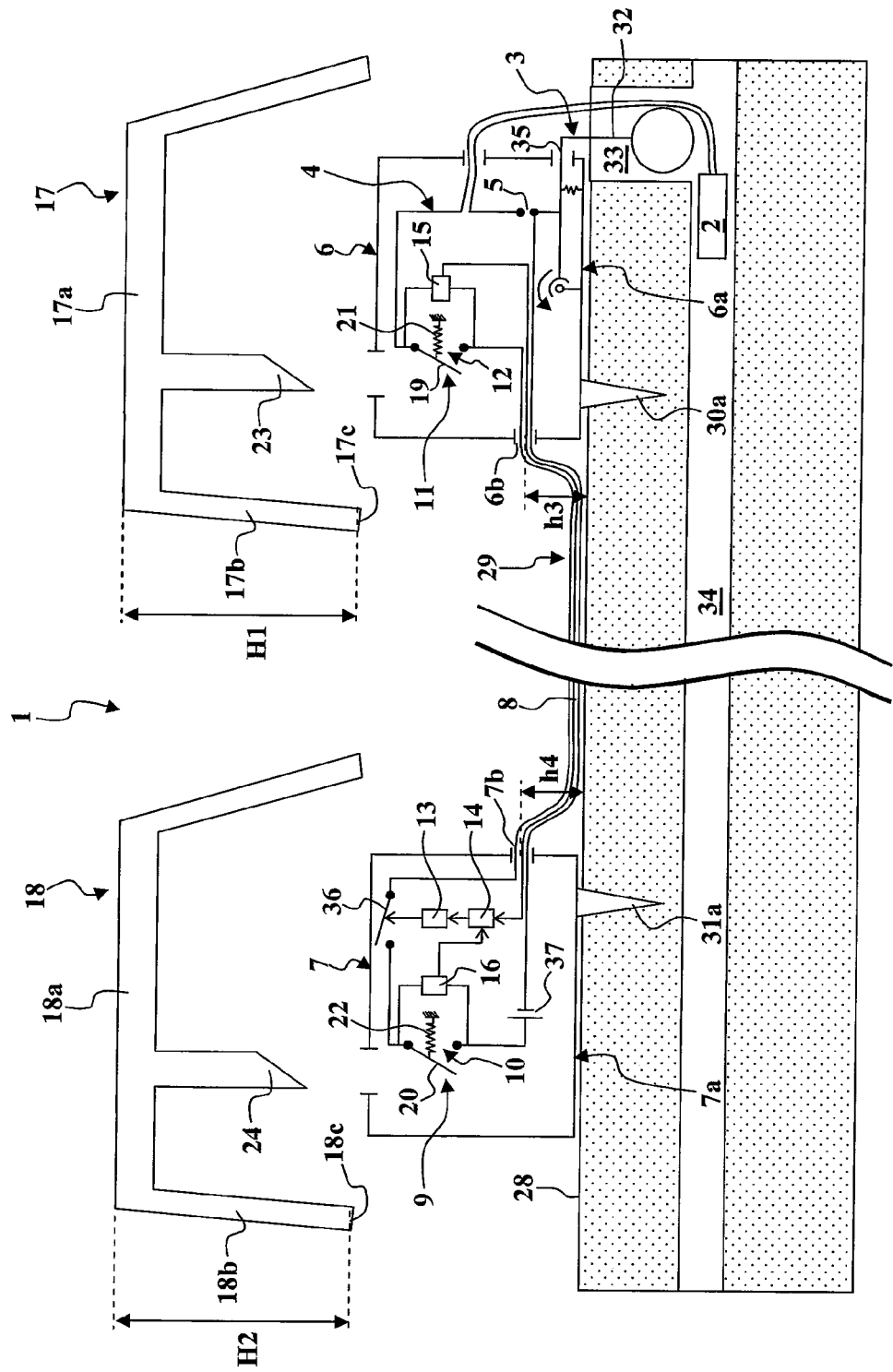
FIG. 9 is a schematic side cross-sectional view of the pyrotechnic device of FIG. 2 according to the first embodiment of the invention.
Figure 10:
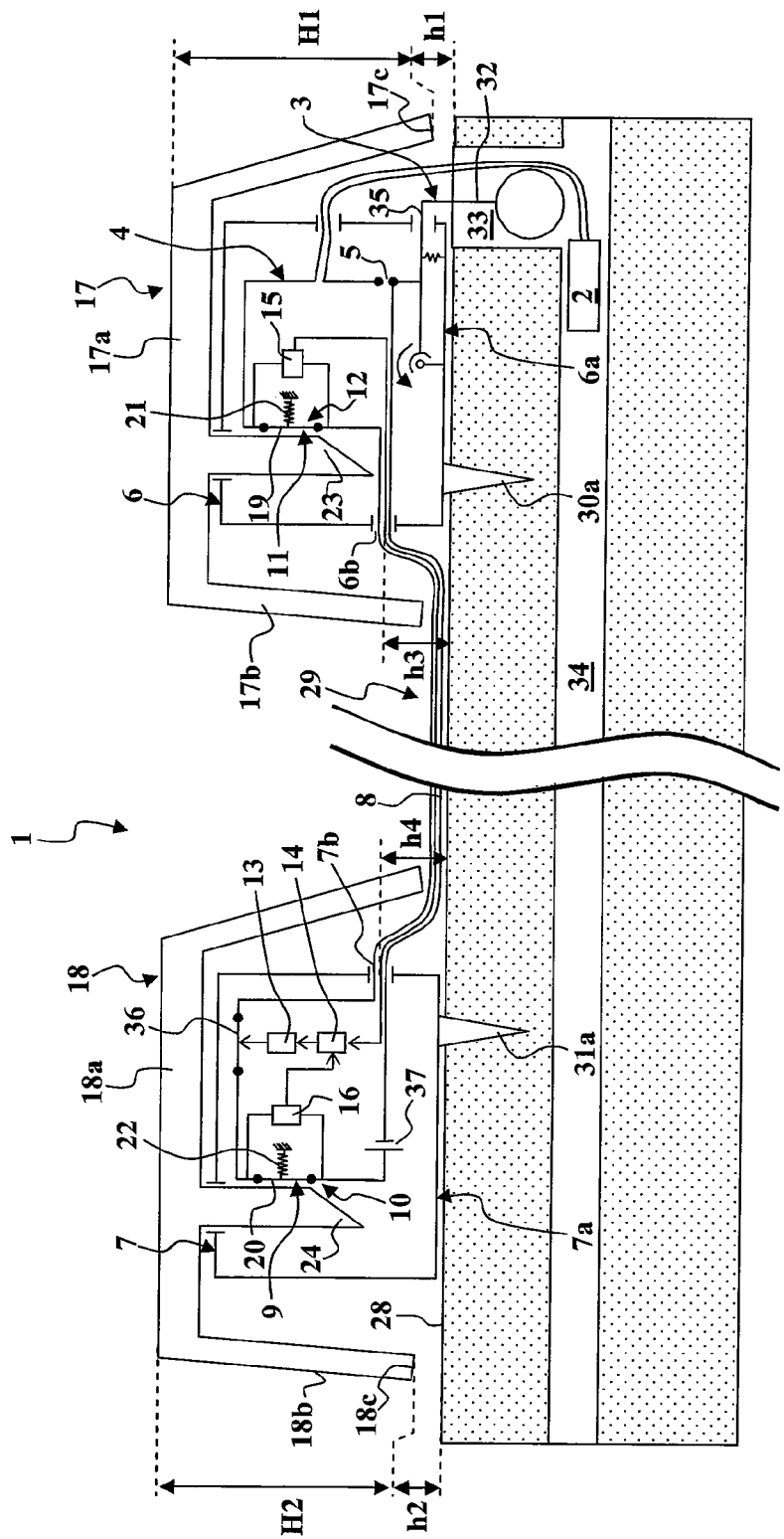
FIG. 10 is a schematic side cross-sectional view of the pyrotechnic device of FIG. 1 according to the first embodiment of the invention.

FIGS. 9 and 10 more particularly show that the pyrotechnic device 1 comprises:
a first housing 6 intended to be installed on the ground, electrically connected to the pyrotechnic charge 2, and comprising detection means 3,
a second housing 7 intended to be installed on the ground, linked to the first housing 6 via wired connection means 8, and comprising first means 9 of breaking (FIGS. 9 and 10) the electrical firing circuit 4 making it possible to selectively break (FIG. 9) or establish (FIG. 10) the continuity of a first section 10 of the electrical firing circuit 4.

In a first variant of the invention, the connection means 8 between the first and second housings 6 and 7 are rigid, preferably at least approximately one meter long, which guarantees that the second housing 7 is always a sufficient distance away from the pyrotechnic charge 2 for the user not to risk being injured in the case of accidental firing of the pyrotechnic charge 2.

Figure 2:
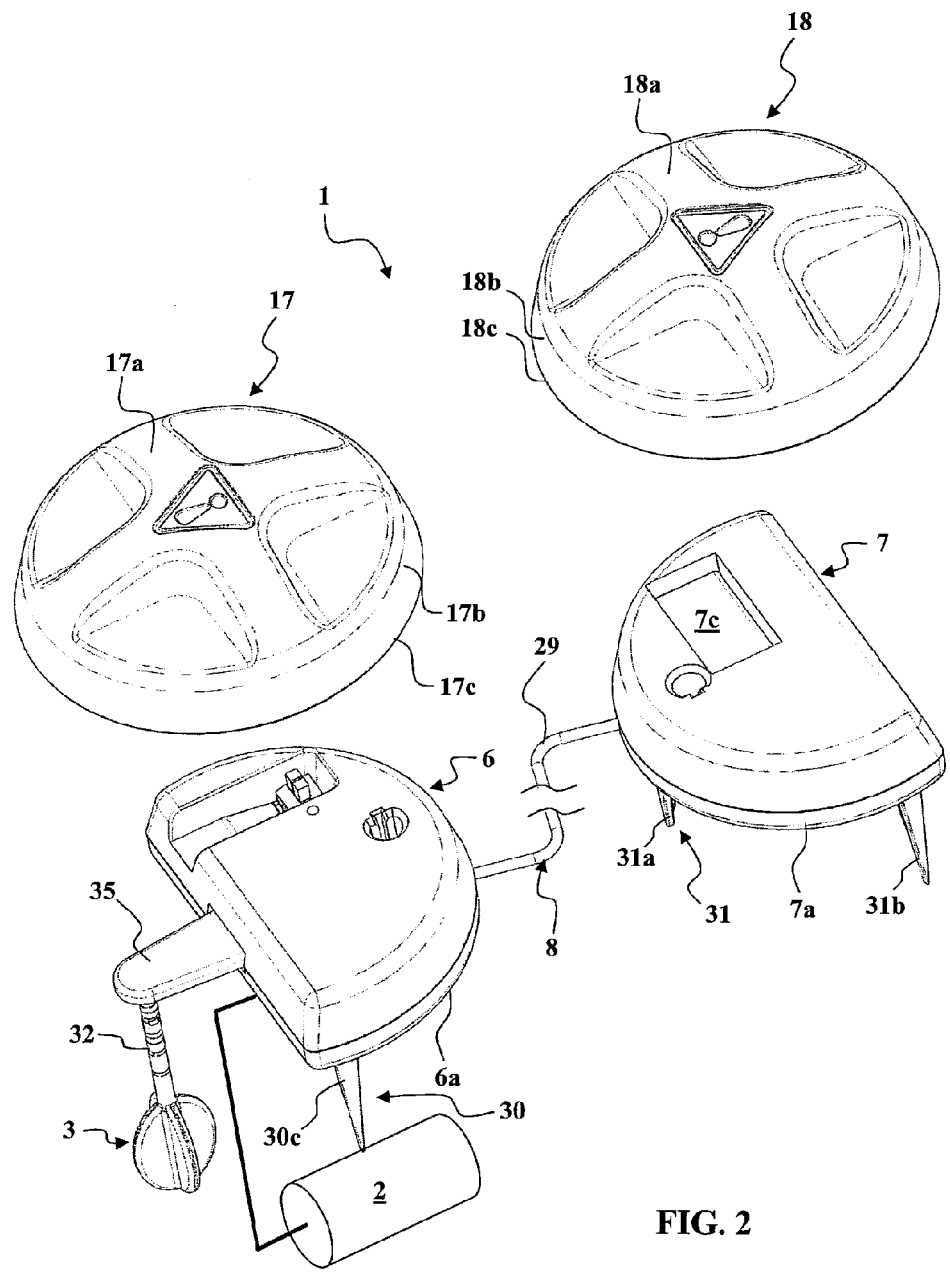
FIG. 2 is a perspective view of the pyrotechnic device of FIG. 1 with the first and second removable covers in the removed position.
Figure 3:
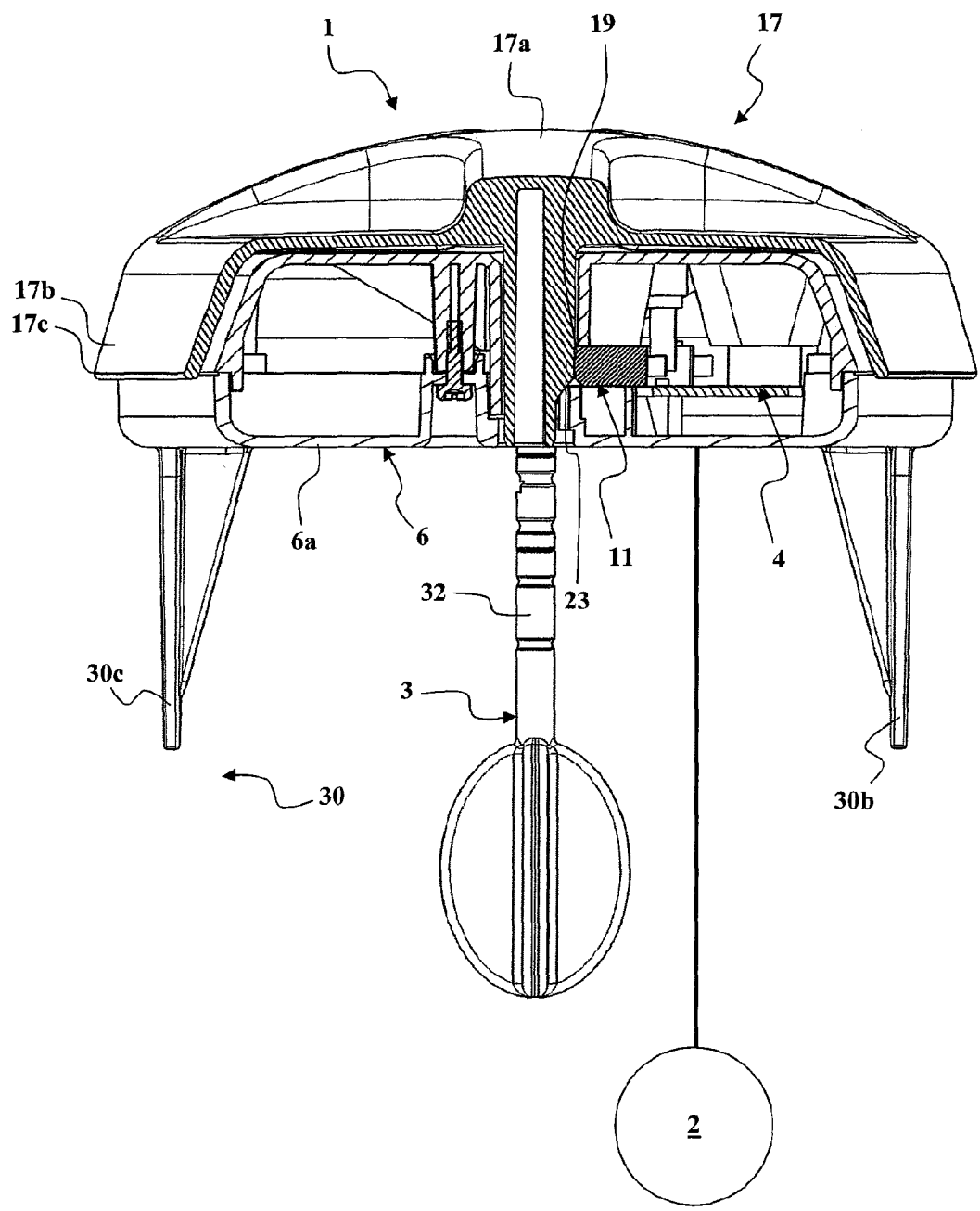
FIG. 3 is a front cross-sectional view of the first housing of the pyrotechnic device of FIG. 1.
Figure 4:
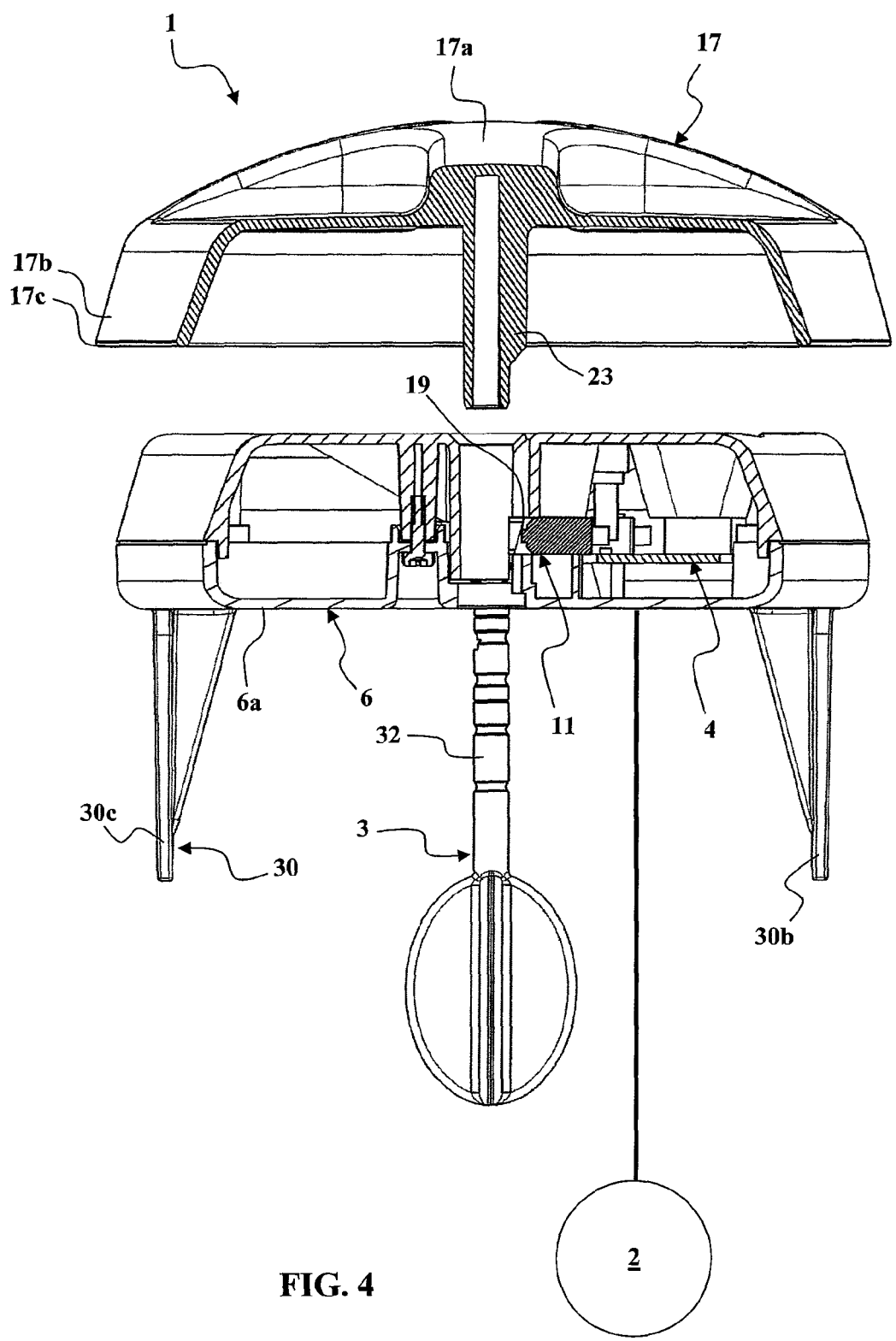
FIG. 4 is a front cross-sectional view of the first housing of the pyrotechnic device of FIG. 2.
Figure 5:
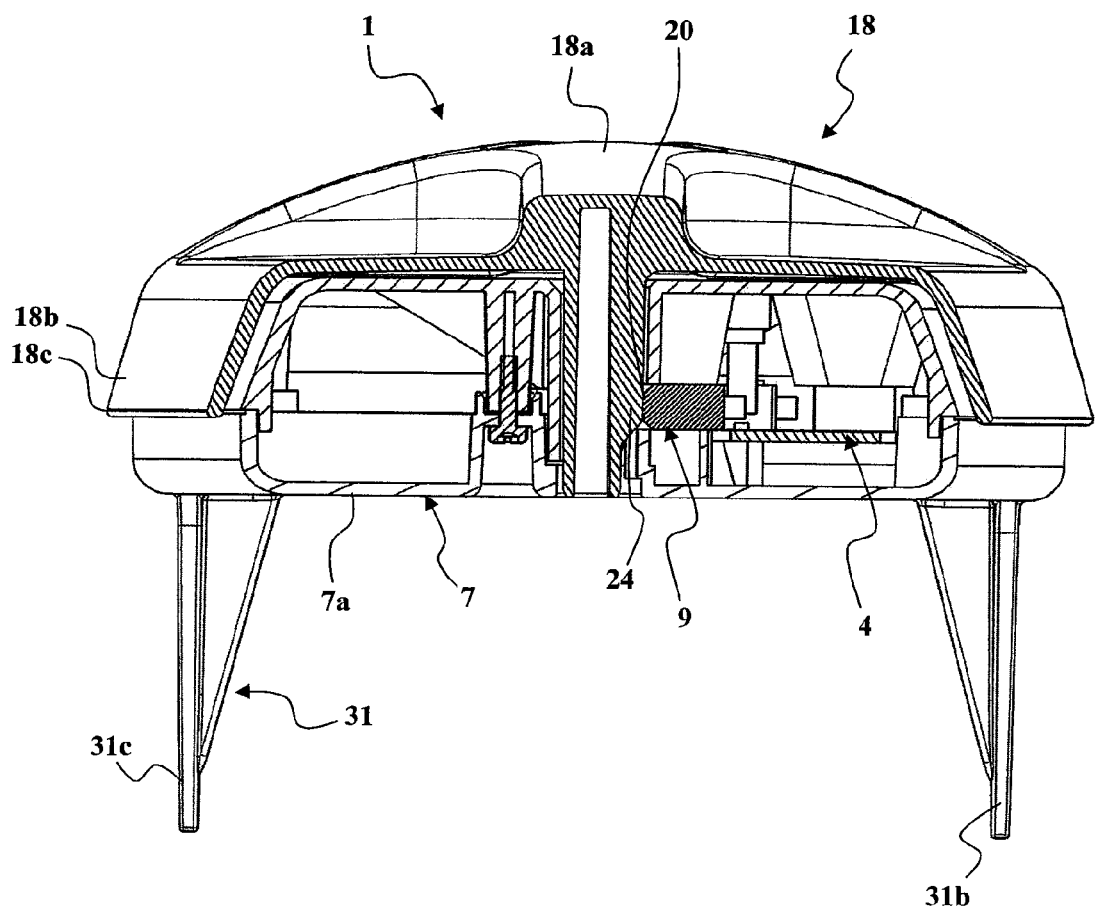
FIG. 5 is a front cross-sectional view of the second housing of the pyrotechnic device of FIG. 1.
Figure 6:
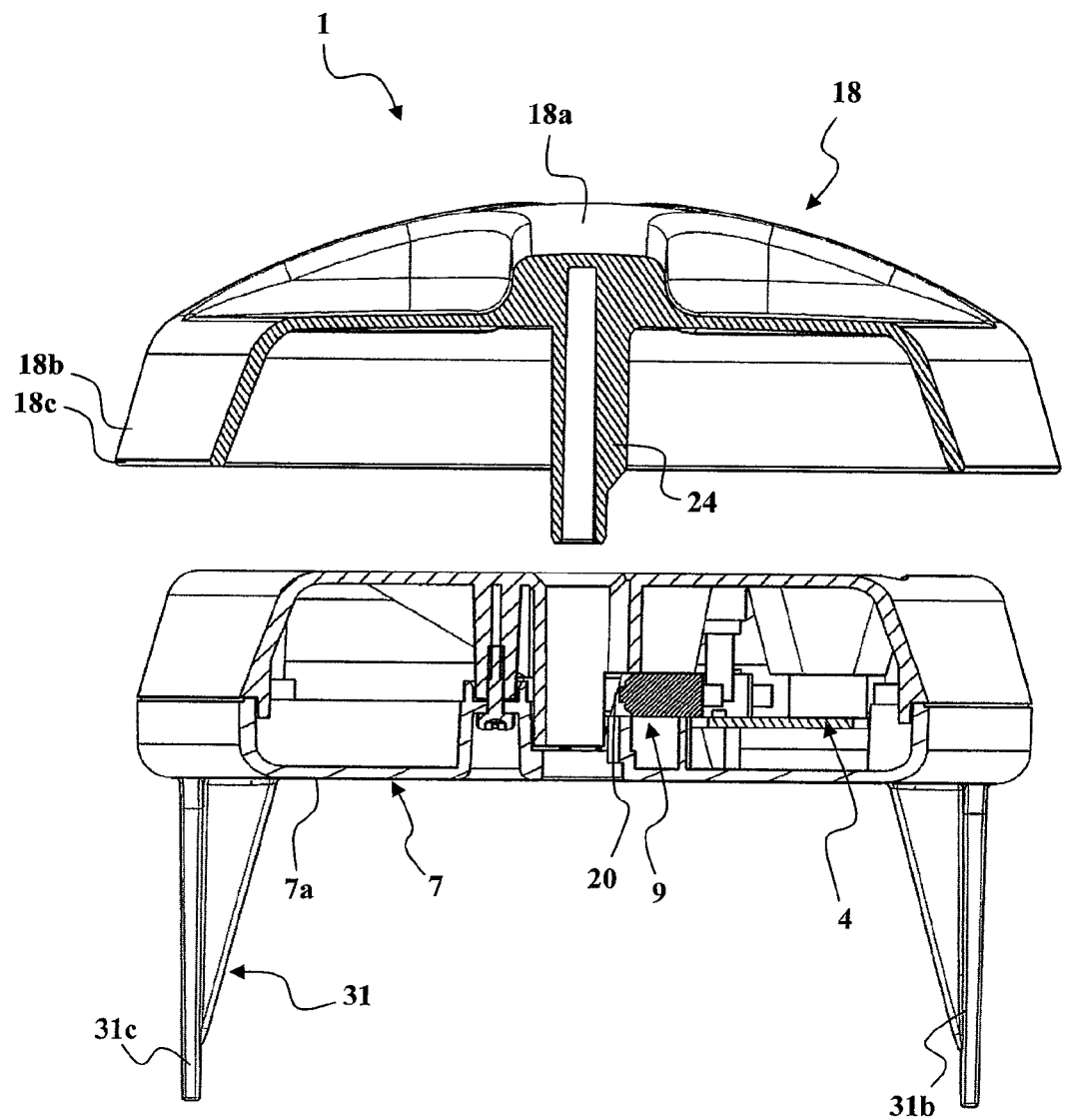
FIG. 6 is a front cross-sectional view of the second housing of the pyrotechnic device of FIG. 2.

FIG. 2 more particularly shows that the second housing 7 comprises a recess 7c intended to removably receive an electrical feed power source for the electrical firing circuit 4. The electrical feed power source may, for example, take the form of batteries, rechargeable or not.

FIGS. 9 and 10 more particularly show that the first housing 6 includes second means 11 for breaking the electrical firing circuit 4, making it possible to selectively break (FIG. 9) or establish (FIG. 10) the continuity of a second section 12 of the electrical firing circuit 4.

In order to force the user to observe a precise installation sequence ensuring an even more effective protection for the user, the pyrotechnic device 1 includes:
means 13 for disabling the electrical firing circuit 4, driven by control means 14,
means 15 and 16 for detecting the state of the first breaking means 9 and of the second breaking means 11.

Provision is made, when the first breaking means 9 establish the continuity of the first section 10 before the second breaking means 11 have established the continuity of the second section 12, for the control means 14 to drive the disabling means 13 to disable the firing circuit 4.

FIGS. 1 to 11 show that:
the second breaking means 11 comprise a first removable cover 17, which can be fitted over the first housing 6 and over the detection means 3 in a covering position (FIGS. 1, 3, 7, 8 and 10), and which can be separated from the first housing 6 in a removed position (FIGS. 2, 4, 9 and 11),
in the removed position of the first cover 17, the continuity of the second section 12 of the electrical firing circuit 4 is broken (FIGS. 9 and 11),
in the covering position of the first cover 17, the continuity of the second section 12 of the electrical firing circuit 4 is established (FIG. 10).

It will also be observed that:
the first breaking means 9 comprise a second removable cover 18, which can be fitted over the second housing 7 in a covering position (FIGS. 1, 5, 7, 8 and 10), and which can be separated from the second housing 7 in a removed position (FIGS. 2, 6 and 9),
in the removed position of the second cover 18, the continuity of the first section 10 of the electrical firing circuit 4 is broken (FIG. 9),
in the covering position of the second cover 18, the continuity of the first section 10 of the electrical firing circuit 4 is established (FIG. 10).

In a first embodiment of the invention, more particularly schematically illustrated in FIGS. 9 and 10, provision is made for:
the first or second breaking means 9 and 11 of the electrical firing circuit 4 to comprise a switch 20 or 19 which can be displaced or deformed, connected in series in the electrical firing circuit 4, and permanently returned to the open position by elastic return means 22 or 21,
the first or second cover 17 and 18 to include bearing means 23 and 24 which, when said first cover, respectively second cover 18, is displaced to the covering position, push back the switch 19 or 20 to the closed position against the elastic return means 21 or 22.

Figure 11:
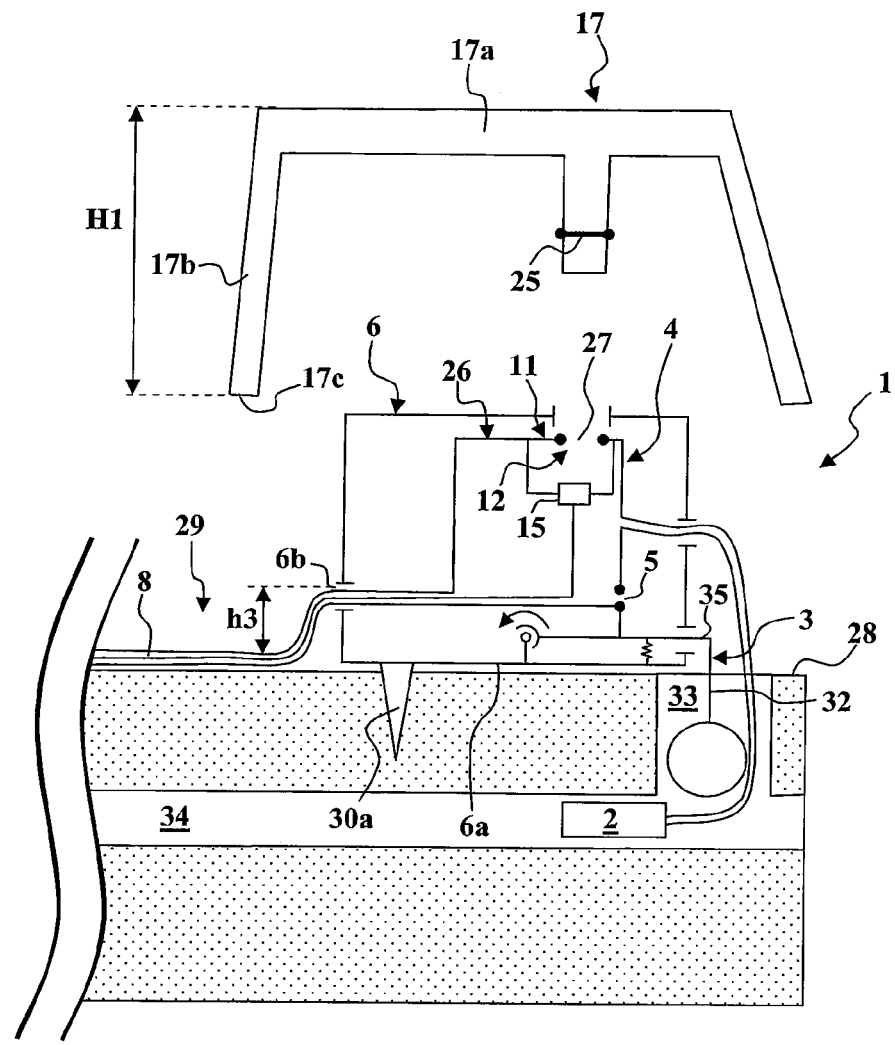
FIG. 11 is a schematic side cross-sectional view of the first housing of the pyrotechnic device of FIG. 1 according to a second embodiment of the invention, with the first removable cover in the removed position.
Figure 12:
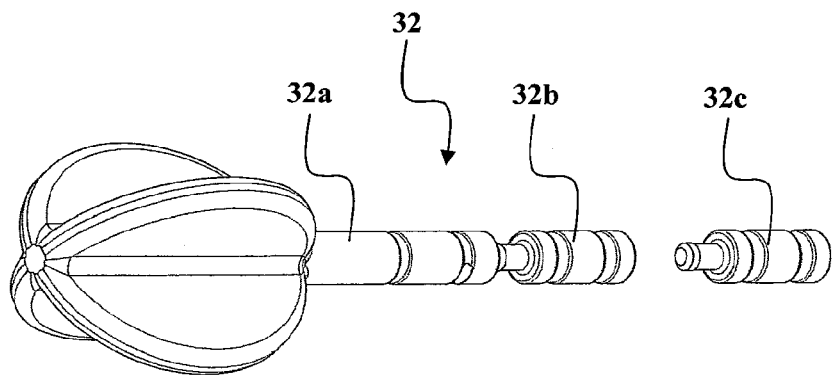
FIG. 12 is a perspective view of a feeler during assembly.

A second embodiment of the invention is partially represented in FIG. 11: only a first housing 6 is represented. This second embodiment differs from the first embodiment by the structure of the second breaking means 11.

FIG. 11 more particularly shows that:
the electrical firing circuit 4 comprises a movable circuit section 25 attached to the first cover 17, and comprises a fixed circuit part 26 attached to the first housing 6, said fixed circuit part 26 comprising a break 27,
when the first cover 17 is in the covering position (not represented in the Figures), the movable circuit section 25 is in contact with the fixed circuit part 26 to establish the continuity of the electrical firing circuit 4 in the area of the break 27.

The first breaking means 9 may also comprise a structure similar to that of the second breaking means 11 illustrated in FIG. 11.

It is also possible to envisage one or other of the breaking means 9 or 11 having a structure similar to that illustrated in FIG. 11, while the other breaking means 9 or 11 has a structure similar to that illustrated in FIGS. 9 and 10.

FIGS. 1 to 11 show that:
the first housing 6 has a bottom laying face 6a suitable for resting on the ground 28,
the first housing 6 and the first cover 17 are conformed and dimensioned so that, when the first housing 6 rests on the ground 28 and the first cover 17 is in the covering position (FIGS. 1, 3, 7, 8 and 10), the first cover 17 prevents a user from being able to manually grasp the first housing 6 and the detection means 3.

The risk of a user managing to grasp the first housing 6 and/or the detection means 3 and thus trigger a firing of the pyrotechnic charge 2 that might injure him or her is thus effectively limited. In fact, the user is forced to remove the first cover 17 in order to be able to grasp the first housing 6 and/or the detection means 3, which breaks the electrical firing circuit 4 by virtue of the second breaking means 11.

Similarly, provision is made for:
the second housing 7 to have a bottom laying face 7a suitable for resting on the ground 28,
the second housing 7 and the second cover 18 to be conformed and dimensioned so that, when the second housing 7 rests on the ground 28 and the second cover 18 is in the covering position (FIGS. 1, 5, 7, 8 and 10), the second cover 18 prevents a user from being able to manually grasp the second housing 7.

A user beginning to dismantle the pyrotechnic device 1 after the latter has been installed will therefore be able to grasp the second housing 7 only after having first removed the second cover 18, which will have had the effect of deactivating the pyrotechnic device 1 by breaking the electrical firing circuit 4 by means of the first breaking means 9.

Figure 7:
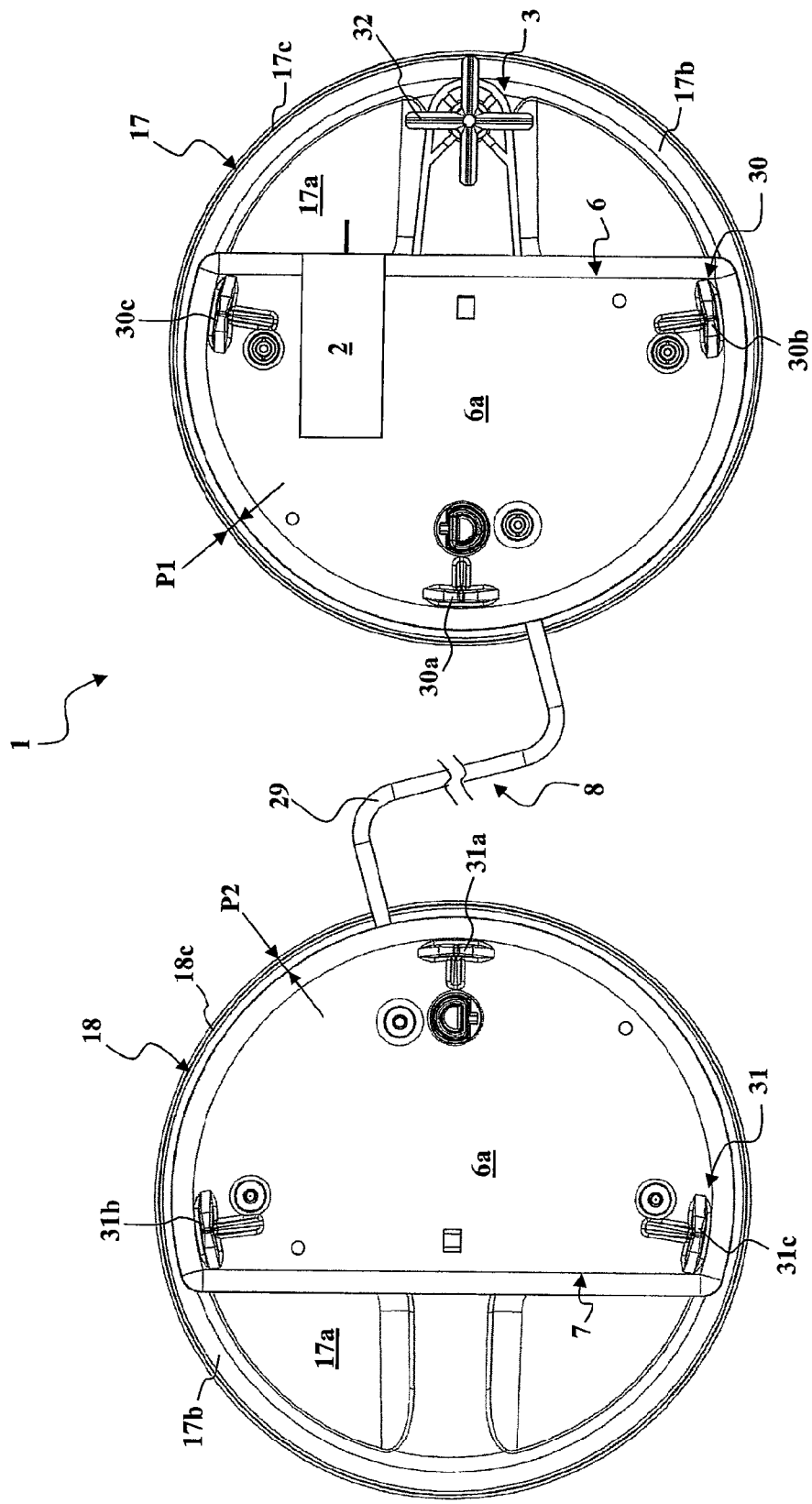
FIG. 7 is a bottom view of the pyrotechnic device of FIG. 1.
Figure 8:
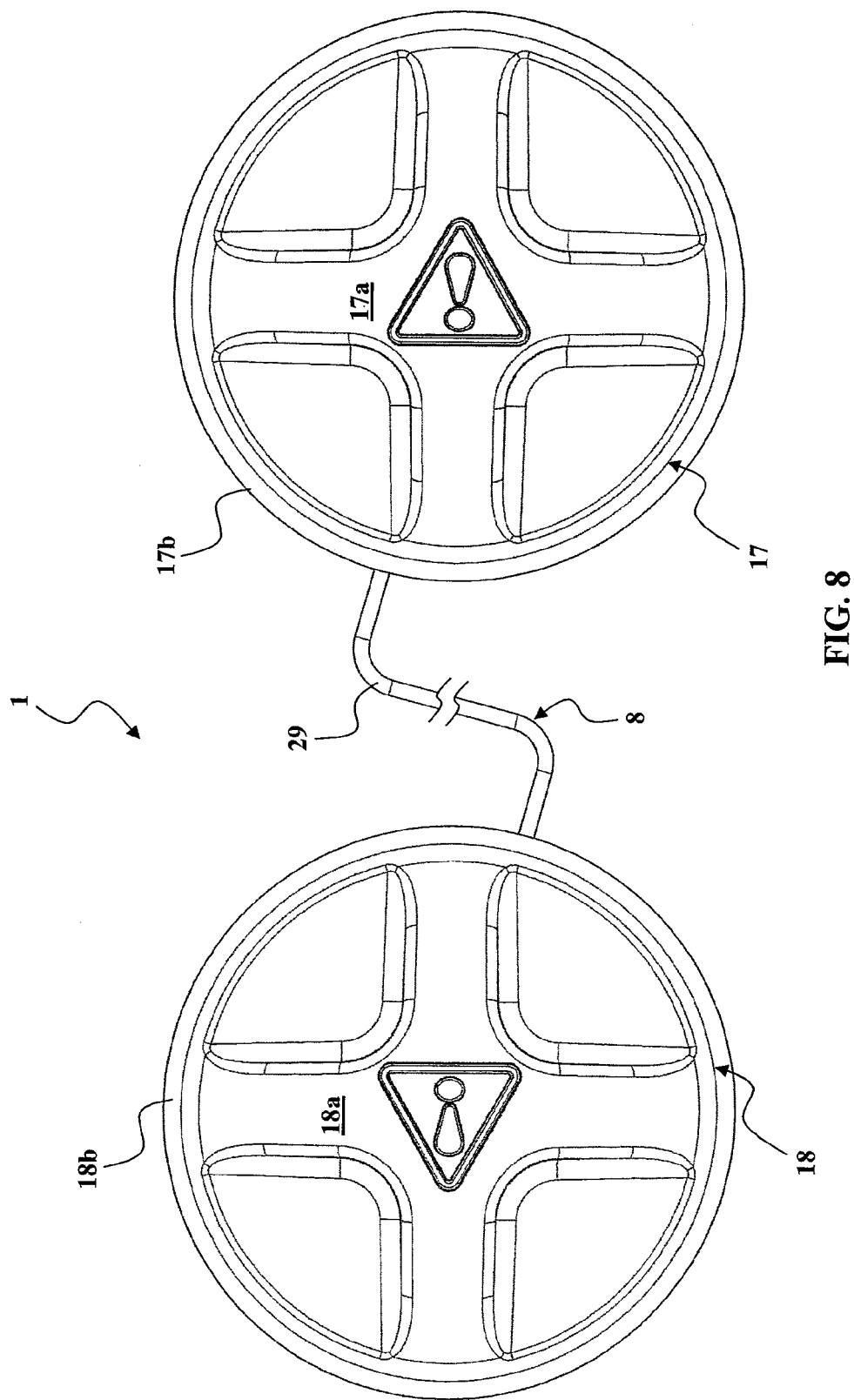
FIG. 8 is a plan view of the pyrotechnic device of FIG. 1.

In practice, provision is made for the first cover 17 to have a top wall 17a of dimensions such that said top wall 17a juts out all around the first housing 6 and the detection means 3 by a peripheral overhang P1 (FIGS. 1 and 7).

Similarly, the second cover 18 has a top wall 18a of dimensions such that said top wall 18a juts out all around the second housing 7 by a peripheral overhang P2 (FIGS. 1 and 7).

In order to ensure an even more effective operation of the first cover 17, provision is made for:
the first housing 6 to include a bottom laying face 6a suitable for resting on the ground 28,
the first cover 17 to include a lateral peripheral wall 17b extending away from the top wall 17a to a bottom peripheral edge 17c,
the lateral peripheral wall 17b of the first cover 17 to extend by a height H1 such that, when the first housing 6 rests on the ground 28 and the first cover 17 is fitted in the covering position over the first housing 6, the bottom peripheral edge 17c is situated in the vicinity of the level of the bottom laying face 6a.

This more effectively limits the access to the first housing 6 and to the detection means 3 when the pyrotechnic device 1 is put in place on the ground 28 and activated. In practice, provision will be able to be made for the bottom peripheral edge 17c to be situated at a reduced height h1 from the bottom laying face 6a, this height h1 being at the most approximately one centimeter, in order to prevent the passage of fingers between the bottom peripheral edge 17c and the ground 28.

The same applies for the second housing 7, the second cover 18 of which includes a lateral peripheral wall 18b extending away from the top wall 18a to a bottom peripheral edge 18c. The lateral peripheral wall 18b of the second cover 18 extends by a height H2 such that, when the second housing 7 rests on the ground 28 and the second cover 18 is fitted in the covering position over the second housing 7, the bottom peripheral edge 18c is situated in the vicinity of the level of the bottom laying face 7a. The height h2 between the bottom peripheral edge 18c and the bottom laying face 7a also does not exceed approximately one centimeter.

In order to limit the bulk of the pyrotechnic device 1 both at the time of sale and in storage, the connection means 8 may comprise flexible electrical conduction means 29 (FIGS. 9 and 10). In this case, it is advantageous for the connection means 8 to penetrate into the first housing 6 and/or into the second housing 7 through entries 6b and 7b which are situated at heights h3 and h4 which are respectively greater than the heights h1 and h2 which separate the bottom peripheral edges 17c and 18c from the level of the bottom laying faces 6a and 7a.

The heights h1 to h4 are provided such that, when the flexible electrical conduction means 29 are pulled by a user, the bottom peripheral edges 17c and 18c are also raised to heights h3 or h4 which are sufficient for the breaking means 9 and 11 to break the continuity of the electrical firing circuit 4.

FIGS. 1 and 7 more particularly show that the first housing 6 includes means 30 for anchoring in the ground 28 (FIGS. 9 to 11), extending from the bottom laying face 6a. In the case in point, the anchoring means 30 comprise three spikes 30a to 30c which make it possible to stably anchor the first housing 6 in the ground 28.

Similarly, the second housing 7 includes anchoring means 31 with three spikes 31a to 31c which make it possible to stably anchor the second housing 7 in the ground 28 (FIGS. 9 to 11). The anchoring means 30 and 31 prevent a user from inducing a movement on the first housing 6 and on the detection means 3 or on the second housing 7, a movement that could trigger an accidental firing of the pyrotechnic charge 2.

In the pyrotechnic device 1 illustrated in FIGS. 1 to 4, 7 and 9 to 12, the detection means 3 comprise a feeler 32 intended to be wholly or partly inserted into the tunnel of the animal. Since the tunnel of the animal may be situated at variable depths, the feeler 32 comprises a plurality of rod sections 32a to 32c (FIG. 12), some of which (32b, 32c) are separable. Depending on the depth of the tunnel of the animal, the user can choose to add to the end section 32a one or more separable sections 32b and 32c.

In an alternative, not represented in the Figures, the feeler 32 may comprise a telescopic rod with sliding sections, the telescopic nature of the rod making it possible to continuously and best adjust the length of the feeler 32 to the depth of the tunnel of the animal.

The use of the pyrotechnic device 1 according to the invention is explained hereinbelow by means of FIGS. 9 and 10.

The user begins by unplugging the vertical chimney 33 of the molehill to reach the tunnel 34. The pyrotechnic charge 2 is installed in the tunnel 34. Then, the feeler 32 is assembled in order for the latter to have a sufficient height.

The feeler 32 is then fixed by its top end to a lever 35, more particularly visible in FIG. 2, said lever 35 being able to be displaced to close the firing contactor 5.

The user then mounts the first housing 6 provided with the feeler 32 over the molehill by engaging the feeler 32 in the vertical chimney 33 of the molehill. Up to that point, the first housing 6 is without its first removable cover 17, which ensures a breaking of the second section 12 of the electrical firing circuit 4. Similarly, up to that point, the second housing 7 is without its second removable cover 18, which ensures a breaking of the continuity of the first section 10 of the electrical firing circuit 4. The user thus does not risk accidentally triggering the firing of the pyrotechnic charge 2.

When putting the first housing 6 in place, the user anchors the latter in the ground 28 using the spikes 30a to 30c.

The user then fits the first removable cover 17 in the covering position, which has the effect of establishing the continuity of the second section 12 of the electrical firing circuit 4. The pyrotechnic device 1 is not, however, yet activated.

The user then moves away from the first housing 6 and from the pyrotechnic charge 2 in order to install the second housing 7, which he or she anchors in the ground 28 using the spikes 31a to 31c.

The user then fits the second removable cover 18 in the covering position, which has the effect of establishing the continuity of the first section 10 of the electrical firing circuit 4.

During the installation described above, the means 15 for detecting the state of the second breaking means 11 signal to the control means 14 that the continuity of the second section 12 has been established and the means 16 for detecting the state of the first breaking means 9 signal to the control means 14 that the continuity of the first section 10 has been established.

The control means 14 identify that, chronologically, the continuity of the first section 10 has been established after the continuity of the second section 12 was established. The control means 14 then drive the disabling means 13 to close a switch 36. The electrical firing circuit 4 is then in the configuration illustrated in FIG. 10, that is to say that the pyrotechnic charge 2 is ready to explode if the detection means 3 are actuated by an animal.

If, on the other hand, the control means 14 detect an establishing of the continuity of the first section 10 before the establishing of the continuity of the second section 12, then the disabling means 13 are driven so as to disable the firing circuit 4 by opening the switch 36 (FIG. 9). In fact, such a sequence in establishing the continuities of the first and second sections 10 and 12 tends to signify that the user is in immediate proximity of the pyrotechnic charge 2, which must therefore be prevented from exploding.

After the pyrotechnic device 1 has been installed, the first and second covers 17 and 18 limit any access on the part of a user or of a child respectively to the detection means 3 and to the first housing 6 or to the second housing 7, which prevents any accidental firing of the pyrotechnic charge 2. In fact, to manipulate the pyrotechnic device 1 and/or remove it, the user or the child is forced to first remove one or other of the first or second removable covers 17 or 18, which has the effect of breaking the continuity of the electrical firing circuit 4. The pyrotechnic device 1 is then deactivated and the pyrotechnic charge 2 can no longer be fired.

The safety of the users and of the children is thus ensured during installation, use and removal of the pyrotechnic device 1.

When the pyrotechnic device 1 is activated and an animal displaces the feeler 32 (for example when a mole tries to plug again the vertical chimney 33), the movement is transmitted to the lever 35 which is displaced to close the firing contactor 5. The electrical energy from the electrical power source 37 then fires the pyrotechnic charge 2, which explodes and kills the animal.

The present invention is not limited to the embodiments which have been explicitly described, but it includes the miscellaneous variants and generalizations thereof contained within the scope of the claims below.

The invention claimed is:

1. A pyrotechnic device intended for the destruction of animals digging tunnels such as moles by the firing of a pyrotechnic charge, comprising means for detecting the animal and an electrical firing circuit comprising a firing contactor driven by the detection means, wherein the pyrotechnic device comprises:
a first housing intended to be installed on the ground, electrically connected to the pyrotechnic charge and comprising the detection means, a second housing intended to be installed on the ground at a distance from the first housing, linked to the first housing via wired connection means, and comprising first means for breaking the electrical firing circuit that can assume a breaking state and a continuity state which respectively break or establish the continuity of a first section of the electrical firing circuit, and wherein the first housing comprises second means for breaking the electrical firing circuit which can selectively assume a breaking state and a continuity state which respectively break or establish the continuity of a second section of the electrical firing circuit.

2. A pyrotechnic device according to claim 1, wherein the connection means between the first and second housings are rigid.

3. A pyrotechnic device according to claim 1, wherein the connection means extend between the first and the second housings by a length of at least one meter approximately.

4. A pyrotechnic device according to claim 1, wherein the second housing comprises an electrical power source for the electrical firing circuit.

5. A pyrotechnic device according to claim 1, wherein:
the pyrotechnic device comprises means for disabling the electrical firing circuit, driven by control means,
the pyrotechnic device comprises means for detecting the state of the first breaking means and of the second breaking means,
when the first breaking means switch from the breaking state to the continuity state while the second breaking means are in the breaking state, the control means drive the disabling means to disable the electrical firing circuit until the first and second breaking means are once again in the breaking state.

6. A pyrotechnic device according to claim 1, wherein:
the second breaking means include a first removable cover, which can be fitted over the first housing and over the detection means in a covering position, and which can be separated from the first housing in a removed position,
in the removed position of the first cover, the continuity of the second section of the electrical firing circuit is broken,
in the covering position of the first cover, the continuity of the second section of the electrical firing circuit is established.

7. A pyrotechnic device according to claim 6, wherein:
the first breaking means include a second removable cover, which can be fitted over the second housing in a covering position, and which can be separated from the second housing in a removed position,
in the removed position of the second cover, the continuity of the first section of the electrical firing circuit is broken,
in the covering position of the second cover, the continuity of the first section of the electrical firing circuit is established.

8. A pyrotechnic device according to claim 7, wherein:
the first or second means for breaking the electrical firing circuit comprise a switch, connected in series in the electrical firing circuit, and permanently returned to an open position by elastic return means,
the first or second cover includes bearing means which, when said first or second cover is displaced to the covering position, push back the switch to a closed position against the elastic return means.

9. A pyrotechnic device according to claim 7, wherein:
the first or second means for breaking the electrical firing circuit comprises a movable circuit section attached to the first or second cover, and a fixed circuit part attached to the first or second housing, said fixed circuit part including a break,
when the first or second cover is in the covering position, the movable circuit section is in contact with the fixed circuit part to establish the continuity of the electrical firing circuit in an area of the break.

10. A pyrotechnic device according to claim 7, wherein:
the first or second housing has a bottom laying face suitable for resting on the ground,
the first housing and the first cover, or the second housing and the second cover, are conformed and dimensioned so that, when the first or second housing rests on the ground and the first or second cover is in the covering position, the first or second cover prevents a user from being able to manually grasp the first housing and the detection means or the second housing.

11. A pyrotechnic device according to claim 7, wherein the first or second cover includes a top wall of dimensions such that said top wall juts out all around the first housing and the detection means or the second housing by a peripheral overhang.

12. A pyrotechnic device according to claim 11, wherein:
the first or second housing includes a bottom laying face suitable for resting on the ground,
the first or second cover includes a lateral peripheral wall extending away from the top wall to a bottom peripheral edge,
the lateral peripheral wall of the first or second cover extends by a height such that,
when the first or second housing rests on the ground and the first or second cover is fitted respectively on the first or second housing, the bottom peripheral edge is located in a vicinity of a level of the bottom laying face.

13. A pyrotechnic device according to claim 12, wherein:
the connection means include flexible electrical conduction means,
the connection means penetrate into the first and/or second housing through an entry which is situated at a height relative to the bottom laying face which is greater than a height which separates the bottom peripheral edge of the first or second cover from the level of the bottom laying face.

14. A pyrotechnic device according to claim 1, wherein the detection means comprise a feeler intended to be wholly or partly inserted into a tunnel of the animal.

15. A pyrotechnic device according to claim 14, wherein said feeler comprises a plurality of separable rod sections.

16. A pyrotechnic device according to claim 14, wherein said feeler comprises a telescopic rod.

17. A pyrotechnic device according to claim 1, wherein:
the first or second housing includes a bottom laying face suitable for resting on the ground,
the first or second housing includes means for anchoring in the ground, extending from the bottom laying face.

18. A pyrotechnic device intended for the destruction of animals digging tunnels such as moles by the firing of a pyrotechnic charge, comprising means for detecting the animal and an electrical firing circuit comprising a firing contactor driven by the detection means,
wherein:
the pyrotechnic device comprises a first housing intended to be installed on the ground, electrically connected to the pyrotechnic charge and comprising the detection means,
the pyrotechnic device comprises a second housing intended to be installed on the ground at a distance from the first housing, linked to the first housing via wired connection means, and comprising first means for breaking the electrical firing circuit that can assume a breaking state and a continuity state which respectively break or establish the continuity of a first section of the electrical firing circuit, the first breaking means include a second removable cover, which can be fitted over the second housing in a covering position, and which can be separated from the second housing in a removed position, in the removed position of the second cover, the continuity of the first section of the electrical firing circuit is broken, and in the covering position of the second cover, the continuity of the first section of the electrical firing circuit is established.

* * * * *